United States Patent [19]

Eichenauer et al.

[11] Patent Number: 4,912,168
[45] Date of Patent: Mar. 27, 1990

[54] THERMOPLASTIC MOLDING COMPOUNDS BASED ON MIXTURES OF VINYL CHLORIDE POLYMERS AND BLOCK COPOLYMERS BASED ON CYCLIC CARBONATES AND LACTONES

[75] Inventors: Herbert Eichenauer; Edgar Leitz, both of Dormagen; Karl-Heinz Ott, Leverkusen; Lothar Meier, Sprockhoevel; Maria Gärtner, Bergisch-Gladbach, all of Fed. Rep. of Germany

[73] Assignee: Bayer Aktiengesellschaft, Leverkusen, Fed. Rep. of Germany

[21] Appl. No.: 318,962

[22] Filed: Mar. 6, 1989

[30] Foreign Application Priority Data

Mar. 17, 1988 [DE] Fed. Rep. of Germany ....... 3808842

[51] Int. Cl.$^4$ ............................................. C08L 69/00
[52] U.S. Cl. ................................... 525/186; 525/185; 525/187
[58] Field of Search ................ 525/186, 412, 413, 187

[56] References Cited

U.S. PATENT DOCUMENTS 3,639,503  2/1972  Matzner ............................... 525/462
4,360,643  11/1982  Naylor ................................. 525/386

Primary Examiner—Theodore E. Pertilla
Attorney, Agent, or Firm—Connolly and Hutz

[57] ABSTRACT

Transparent vinyl chloride polymer molding compounds containing a sequential copolymer having the following idealized formula $$(A\text{-}X\text{-}B)_n \qquad (I)$$

in which
A = a polymer of a cyclic carbonate,
B = a polymer of another cyclic ester and
X = a middle segment containing both partial structures of A and B.

7 Claims, No Drawings

THERMOPLASTIC MOLDING COMPOUNDS BASED ON MIXTURES OF VINYL CHLORIDE POLYMERS AND BLOCK COPOLYMERS BASED ON CYCLIC CARBONATES AND LACTONES

Vinyl chloride polymers (particularly polyvinyl chloride) are widely used starting materials for the production of various plastics articles. It is known that, by combining vinyl chloride polymers with other materials, it is possible to vary or modify the characteristic property profile of vinyl chloride polymers within wide limits. Thus, whereas for example unmodified or only slightly modified polyvinyl chloride (so-called "rigid PVC") is particularly suitable for the production of moldings characterized by average processing behavior, an average heat distortion temperature for moderate toughness and by relatively low flexibility, it is possible using plasticizers of low or medium molecular weight to produce plastics articles ("flexible PVC") which show high flexibility and elasticity at working temperatures. Suitable plasticizers are, for example, phthalates, epoxide compounds, aliphatic diesters, phosphates, polyesters having molecular weights of up to about 3000, trimellitates, citrates or certain aliphatic, optionally chlorinated hydrocarbons. These plasticizers are known (cf. "Encylopedia of PVC", Mariel Dekker, Inc., New York, 1976). In addition, mixtures of so-called polymeric plasticizers (polymers of relatively high molecular weight) with vinyl chloride polymers facilitate the production of "flexible PVC" moldings showing improved mechanical properties (for example improved abrasion resistance, elasticity, solvent resistance and flame resistance). Known polymeric plasticizers are, for example, partially crosslinked butadiene-acrylonitrile copolymers (for example containing approximately 29% acrylonitrile, Mooney viscosities (ML 4, 100° C., DIN 53 523) of 60 to 100), cf. EP 5 736, certain polyurethanes (cf. DE-OS 11 93 241) and special ethylene-vinyl acetate copolymers soluble in organic solvents (cf. EP 5 736).

However, the use of the known plasticizers involves the problem of establishing special property combinations of the modified vinyl chloride polymers without having to use complex mixtures of several plasticizer components or the problem that combinations of properties specifically required cannot be achieved at all.

It has now been found that, by mixing vinyl chloride polymers with special-structure block copolymers based on cyclic carbonates and lactones, it is possible to produce transparent thermoplastic molding compounds of which the properties (particularly tensile strength, low-temperature resistance and hardness) can be established through the composition of the block copolymer component. In addition, the mixtures are characterized by very good processability as thermoplasts, by high thermal and ageing stability, by high resistance to oils and fats and also by low contents of volatile and migrating impurities.

The present invention relates to transparent vinyl chloride polymer molding compounds containing a sequential copolymer having the following idealized formula $$(A-X-B)_n \qquad (I)$$

in which n=1 to 20, preferably 1 to 10,

A is a polymer of a cyclic carbonate corresponding to the following formula ("block A")

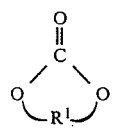
(II)

with $R^1$=—$(CH_2)_n$— with n=3-12, —$CH_2CH_2CH(CH_3)$—, —$CH_2CH_2OCH_2CH_2$—, —$CH_2CH_2OCH_2CH_2OCH_2CH_2$—, —$CH_2CH(CH_3)CH_2CH_2C(CH_3)_2CH_2$—,

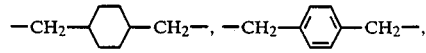

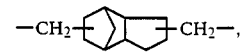

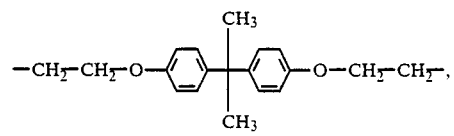

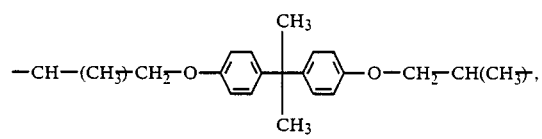

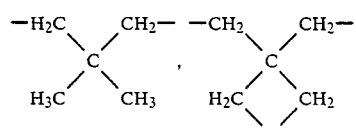

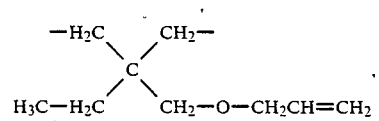

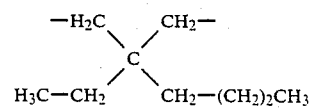

or to the following formula

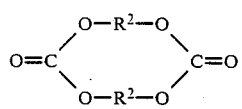
(III)

in which $R^2$=—$(CH_2)_n$ with n=4-12, —$CH_2CH_2OCH_2CH_2$—, —$CH_2CH_2OCH_2CH_2OCH_2CH_2$—

B=polymer of a cyclic ester corresponding to the following formula ("block B")

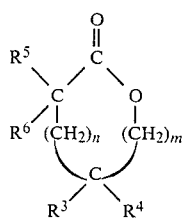

in which

R³, R⁴, R⁵, R⁶ = H, $C_1$-$C_6$ alkyl, $C_3$-$C_6$ alkenyl, $C_1$-$C_6$ alkoxy, $C_1$-$C_6$-alkenoxy-$C_1$-$C_6$-alkyl, more especially H, $CH_3$, $C_2H_5$ and m and n independently of one another = 0, 1, 2, 3, 4, 5 or 6, X is a middle segment containing both the cyclic carbonate of formula (II) and/or (III) and the cyclic ester of formula (IV) in polymerized form, the concentration of the structural units of compounds (II) and/or (III) decreasing continuously towards —B— and the concentration of the structural units of compounds (IV) decreasing continuously towards —A— ("tapered structure") and the content of blocks A comprising 1 to 99% by weight and preferably 10 to 90% by weight (based on the total quantity of the blocks (A+B), the content of blocks B comprising 99 to 1% by weight and preferably 90 to 10% by weight (based on the total quantity of the blocks A+B) and the content of middle segments X comprising 5 to 95% by weight and preferably 10 to 80% by weight (based on the total quantity of A+B+X).

Preferred molding compounds according to the invention consist of (A) 20 to 80% by weight, preferably 30 to 75% by weight and more preferably 40 to 70% by weight vinyl chloride polymer(s) and (B) 80 to 20% by weight, preferably 70 to 25% by weight and more preferably 60 to 30% by weight copolymer(s) corresponding to general formula (I) above.

Vinyl chloride polymers in the context of the invention are, in particular, polyvinyl chloride, preferably having a K value of 30 to 100, and copolymers of vinyl chloride with up to 50% by weight of copolymerizable vinyl esters, maleic anhydride or semiesters of maleic acid.

The vinyl chloride polymers suitable for use in accordance with the invention may be produced by known industrial methods, for example by emulsion, suspension or bulk polymerization.

In the context of the invention, copolymer components having a block-like structure are sequential copolymers having the following idealized formula (A—X—B)ₙ    (I)

in which n = 1 to 20 and preferably 1 to 10,

A is a polymer of a cyclic carbonate corresponding to the following formula ("block A")

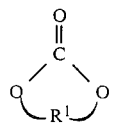

with

R¹ = —(CH₂)ₙ— with n=3–12, —CH₂CH₂CH(CH₃)—, —CH₂CH₂OCH₂CH₂—, —CH₂CH₂OCH₂CH₂OCH₂CH₂—, —CH₂CH(CH₃)CH₂CH₂C(CH₃)₂CH₂—, —CH₂—⟨cyclohexyl⟩—CH₂—, —CH₂—⟨phenyl⟩—CH₂—, —CH₂—⟨bicyclic⟩—CH₂—,

—CH₂—CH₂—O—⟨C₆H₄⟩—C(CH₃)₂—⟨C₆H₄⟩—O—CH₂—CH₂—,

—CH—(CH₃)—CH₂—O—⟨C₆H₄⟩—C(CH₃)₂—⟨C₆H₄⟩—O—CH₂—CH(CH₃)—,

—H₂C\C(CH₃)₂/CH₂—, —H₂C\C(CH₂O CH₂)/CH₂—,

—H₂C\C(CH₂CH₃)(CH₂—O—CH₂CH=CH₂)/CH₂—,

—H₂C\C(CH₂CH₃)(CH₂—(CH₂)₂CH₃)/CH₂— or to the formula

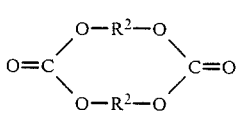

in which

R² = —(CH₂)ₙ with n=4–12, —CH₂CH₂OCH₂CH₂—, —CH₂CH₂OCH₂CH₂OCH₂CH₂—

B = polymer of a cyclic ester corresponding to the following formula ("block B")

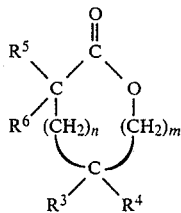

in which

R³, R⁴, R⁵, R⁶=H, $C_1$-$C_6$ alkyl, $C_3$-$C_6$ alkenyl, $C_1$-$C_6$ alkoxy, $C_1$-$C_6$-alkenoxy-$C_1$-$C_6$-alkyl, more especially H, $CH_3$, $C_2H_5$ and m and n independently of one another=0, 1, 2, 3, 4, 5 or 6, X is a middle segment containing both the cyclic carbonate of formula (II) and/or (III) and the cyclic ester of formula (IV) in polymerized form, the concentration of the structural units of compounds (II) and/or (III) decreasing continuously towards —B— and the concentration of the structural units of compounds (IV) decreasing continuously towards —A— ("tapered structure") and the content of blocks A comprising 1 to 99% by weight and preferably 10 to 90% by weight (based on the total quantity of the blocks (A+B), the content of blocks B comprising 99 to 1% by weight and preferably 90 to 10% by weight (based on the total quantity of the blocks A+B) and the content of middle segments X comprising 5 to 95% by weight and preferably 10 to 80% by weight (based on the total quantity of A+B+X).

The average molecular weights of blocks A and B are greater than 500 to 1,000,000 and are preferably in the range from 1000 to 500,000 and more preferably in the range from 2000 to 250,000. The average molecular weights of the middle segments X are in the range from 300 to 20,000 and preferably in the range from 500 to 15,000.

Preferred cyclic carbonates (II) and (III) are trimethylene glycol carbonate, neopentyl glycol carbonate, butane-1,4-diol carbonate and also dimeric carbonates of pentanediol or hexanediol. Neopentyl glycol carbonate is particularly preferred. Preferred lactones (IV) are ε-caprolactone and pivalolactone.

The copolymers may be produced from the cyclic carbonates and esters by anionic ring-opening solution polymerization. A sequential structure of the copolymers is obtained by step-by-step addition of the carbonate/ester mixture to the polymerization-active solution.

Preferred sequential copolymers are the products obtained in accordance with DE-OS 37 00 193 having molecular weights $\overline{M}_w$ in the range from 2000 to 500,000 and preferably in the range from 5000 to 400,000.

Modifiers of the type typically used for vinyl chloride polymers may if necessary be added to the molding compositions according to the invention, for example to improve certain mechanical properties, such as their heat distortion temperature, etc. It is also possible to add the additives normally used in the processing of PVC, including for example plasticizers, flow aids, flameproofing agents, stabilizers, pigments, antistatic agents, etc.

The molding compounds according to the invention may be compounded in the mixing units normally used in PVC technology. The molding compounds may be produced or rather processed by rolling, molding, extrusion, injection molding, calendering, blow molding, deep drawing, sintering processes, such as for example slush molding, and other standard processes at temperatures in the range of, for example, from 150° to 220° C.

The molding compounds according to the invention are suitable, for example, for the production of coatings, sealing compounds, cable insulating compounds, damping compounds and other parts of high flexibility, for example tubing, but especially for the production of films.

EXAMPLES

Components used

Vinyl polymer-component A

S-polyvinyl chloride having a K-value of 70.

Block copolymer-component B

B1: Block copolymer of the A—X—B type, where A is polyneopentyl glycol carbonate and B is poly-ε-caprolactone. X is a "tapered" transition segment of neopentyl glycol carbonate and ε-caprolactone. The copolymer was obtained by ring-opening anionic copolymerization of neopentyl glycol carbonate and ε-caprolactone. The ratio by weight of the monomers neopentyl glycol carbonate and ε-caprolactone in the copolymer is 89:11 (as determined by ¹H-NMR spectroscopy). The polymer has a relative solution viscosity $\eta_{rel}$ of 3.87 (2% by weight solution in $CH_2Cl_2$ at 20° C.).

B2: As B1, ratio by weight of neopentyl glycol carbonate to ε-caprolactone=62:38; $\eta_{rel}$=3.46 (2% by weight solution in $CH_2Cl_2$ at 20° C.).

B3: As B1, ratio by weight of neopentyl glycol carbonate to ε-caprolactone=50:50; $\eta_{rel}$=5.77 (2% by weight solution in $CH_2Cl_2$ at 20° C.).

B4: As B1, ratio by weight of neopentyl glycol carbonate to ε-caprolactone=33:67; $\eta_{rel}$=5.63 (2% by weight solution in $CH_2Cl_2$ at 20° C.).

B5: As B1, ratio by weight of neopentyl glycol carbonate to ε-caprolactone=10:90; $\eta_{rel}$=2.71 (2% by weight solution in $CH_2Cl_2$ at 20° C.).

Poly-ε-caprolactone C (comparison substance)

Poly-ε-caprolactone was synthesized by ring-opening anionic polymerization of ε-caprolactone in toluene at 15° C. using n-butyl lithium as initiator. The polymer has a relative solution viscosity $\eta_{rel}$ of 4.16 (2% by weight solution in $CH_2Cl_2$ at 20° C.).

The components used were compounded on a roll for 10 minutes at 175° C., 1.0 part by weight Irgastab 17M (Ciba-Geigy) being added as stabilizer. The sheet formed was then molded at 180° C. to form panels from which the test specimens were made.

The compositions and also the resulting test data are shown in Table 1.

The tests were carried out in accordance with the following standards:

Tensile strength (MPa) DIN 53 455

Elongation (%) DIN 53 455

Tear propagation resistance (MPa) DIN 53 515

Shore hardness DIN 53 505

Low-temperature resistance (°C.) DIN 53 372 (dropping weight method)

TABLE 1

| | Compositions and test data of the molding compounds | | | | | | | | | | |
|---|---|---|---|---|---|---|---|---|---|---|---|
| Example no. | (A) parts by weight | (B1) parts by weight | (B2) parts by weight | (B3) parts by weight | (B4) parts by weight | (B5) parts by weight | (C) parts by weight | Tensile strength MPa | Elong-ation | Tear propagation resistance MPa | Shore hardness A/D | Low temperature resistance °C. |
| 1 (invention) | 60 | 40 | — | — | — | — | — | 36.7 | 225 | 120 | 99/72 | −8 |
| 2 (invention) | 60 | — | 40 | — | — | — | — | 30.4 | 275 | 116 | 97/64 | −11 |
| 3 (invention) | 60 | — | — | 40 | — | — | — | 29.0 | 326 | 111 | 98/56 | −13 |
| 4 (invention) | 60 | — | — | — | 40 | — | — | 27.0 | 381 | 81 | 89/40 | −38 |
| 5 (invention) | 60 | — | — | — | — | 40 | — | 18.9 | 332 | 66 | 78/25 | −43 |
| 6 (comparison) | 60 | — | — | — | — | — | 40 | 19.4 | 385 | 61 | 77/25 | −33 |

We claim:

1. Transparent vinyl chloride polymer molding compounds containing a sequential copolymer having the following idealized formula $$(A-X-B)_n \quad (I)$$

in which
n = 1 to 20,
A is a polymer of a cyclic carbonate corresponding to the following formula ("block A")

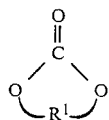  (II)

in which
$R^1 = -(CH_2)_n-$ with n = 3–12, $-CH_2CH_2OCH_2CH_2-$, $-CH_2CH_2OCH_2CH_2OCH_2CH_2-$, $-CH_2CH(CH_3)CH_2CH_2C(CH_3)_2CH_2-$,

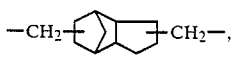

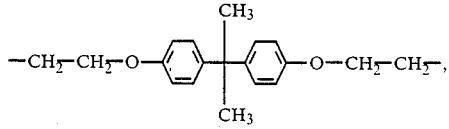

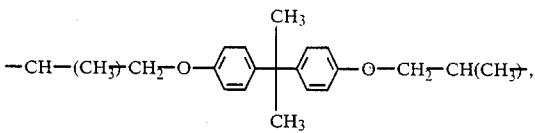

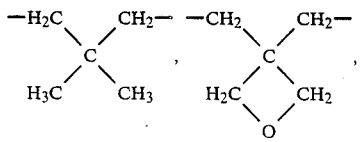

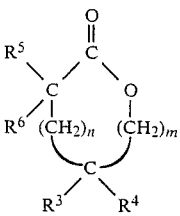

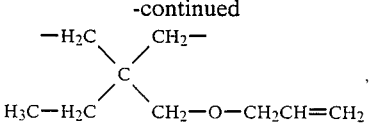

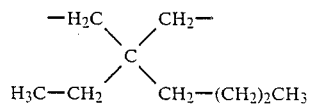

or to the following formula $$\begin{array}{c} O-R^2-O \\ O=C \qquad\qquad C=O \\ O-R^2-O \end{array} \quad (III)$$

in which
$R^2 = -(CH_2)_n-$ with n = 4–12, $-CH_2CH_2OCH_2CH_2-$, $-CH_2CH_2OCH_2CH_2OCH_2CH_2-$ B = polymer of a cyclic ester corresponding to the following formula ("block B")

(IV)

in which
$R^3$, $R^4$, $R^5$, $R^6$ = H, $C_1$–$C_6$ alkyl, $C_3$–$C_6$ alkenyl, $C_1$–$C_6$ alkoxy, $C_1$–$C_6$-alkenoxy-$C_1$–$C_6$-alkyl, and
m and n independently of one another = 0, 1, 2, 3, 4, 5 or 6,
X is a middle segment containing both the cyclic carbonate of the formula (II) or (III) or a mixture thereof, and also the cyclic ester of formula (IV) in polymerized form, the concentration of the structural units of compounds (II), (III) or a mixture thereof decreasing continuously towards —B— and the concentration of the structural units of compounds (IV) decreasing continuously towards —A— ("tapered structure") and the content of blocks A comprising 1 to 99% by weight (based on the total quantity of blocks A and B), the content of blocks B comprising 99 to 1% by weight (based on the total quantity of blocks A and B) and the content of middle segments X comprising 5 to 95% by weight (based on the total quantity of A+B+X).

2. Transparent vinyl chloride polymer molding compounds as claimed in claim 1 consisting of
(A) 20 to 80% by weight vinyl chloride polymer(s) and
(B) 80 to 20% by weight copolymer(s) corresponding to formula (I) in claim 1.

3. Molding compounds as claimed in claim 1, characterized in that a polymer produced by anionic ring-opening polymerization is present as the copolymer component corresponding to formula (I) in claim 1.

4. Molding compounds as claimed in claim 1, characterized in that a copolymer of 1 to 99% by weight neopentyl glycol carbonate and 99 to 1% by weight $\epsilon$-caprolactone is present as the copolymer component corresponding to formula (I) in claim 1.

5. Molding compounds as claimed in claim 1, characterized in that they are suitable for applications typical of flexible PVC comprising film materials, cable insulating compounds, or coatings.

6. Molding compounds as claimed in claim 1, characterized in that they can be processed to films of high strength and elongation by calendering processes or slush molding processes or both.

7. Molding compounds as claimed in claim 1 in which $R^3$, $R_4$, $R^5$; $R^6$=H, $CH_3$ or $C_2H_5$.

* * * * *